(12) United States Patent
Stuntebeck et al.

(10) Patent No.: US 12,277,242 B2
(45) Date of Patent: *Apr. 15, 2025

(54) REDACTING RESTRICTED CONTENT IN FILES

(71) Applicant: Omnissa, LLC, Mountain View, CA (US)

(72) Inventors: Erich Stuntebeck, Johns Creek, GA (US); Chen Lu, Sandy Springs, GA (US)

(73) Assignee: Omnissa, LLC, Mountain View, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/188,143

(22) Filed: Nov. 12, 2018

(65) Prior Publication Data

US 2024/0330492 A1 Oct. 3, 2024

Related U.S. Application Data

(63) Continuation of application No. 15/865,868, filed on Jan. 9, 2018, now Pat. No. 10,127,401.

(51) Int. Cl.
*G06F 21/62* (2013.01)

(52) U.S. Cl.
CPC ...... *G06F 21/6218* (2013.01); *G06F 21/6245* (2013.01)

(58) Field of Classification Search
CPC ............ G06F 21/6218; G06F 21/6245; G06F 21/6236; G06F 21/6254; G06F 21/6263; G06F 21/62
See application file for complete search history.

(56) References Cited

U.S. PATENT DOCUMENTS

| | | | |
|---|---|---|---|
| 10,284,885 B1* | 5/2019 | Borras | G06F 21/10 |
| 2016/0070812 A1* | 3/2016 | Murphy | G06F 21/6218 |
| | | | 707/608 |
| 2019/0005265 A1* | 1/2019 | Panchapakesan | G06F 21/6254 |

* cited by examiner

*Primary Examiner* — Quazi Farooqui
(74) *Attorney, Agent, or Firm* — Kim & Stewart LLP

(57) ABSTRACT

Restricted content of a data file is identified. The restricted content is removed from the data file, and a redacted version of the data file is generated. The restricted content is stored separate from the redacted version of the data file.

19 Claims, 7 Drawing Sheets

REDACTING RESTRICTED CONTENT IN FILES

CROSS-REFERENCE TO RELATED APPLICATIONS

This application is a continuation of and claims the benefit of U.S. patent application Ser. No. 15/865,868, filed Jan. 9, 2018, entitled "REDACTING RESTRICTED CONTENT IN FILES," as well as U.S. patent application Ser. No. 14/673,307, filed Mar. 30, 2015, now U.S. Pat. No. 9,875,372, entitled "REDACTING RESTRICTED CONTENT IN FILES," both of which are incorporated herein by reference in their entireties.

BACKGROUND

Individuals use computing devices to access and edit data files, such as word processing documents, spreadsheets, digital images, and multimedia files. Enterprises, such as businesses and other organizations, typically enact security protocols to limit access to data files that contain confidential information. For example, some enterprises require a user to provide credentials, such as a user name and password, which must be authenticated before the user is granted access to a confidential data file.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to limiting access to restricted content in data files. In one example, a file editor identifies restricted content in a data file and generates a redacted version of the data file in which the restricted content is not included. The restricted content is then stored separate from the redacted version of the data file so that, even if the redacted version of the data file is obtained by an unauthorized user or system, the restricted content is still not accessible to the unauthorized user or system.

Later, a file renderer retrieves the redacted version of the data file and determines whether various compliance rules are satisfied. If the compliance rules are satisfied, the file renderer retrieves the restricted content and combines the restricted content with the redacted version of the data file in order to generate an unredacted version of the data file. The file renderer presents the restricted content as well as unrestricted content for a user.

In the following discussion, examples of systems and their components are described, followed by examples of the operation of those systems. The following examples are non-limiting.

Figure 1:
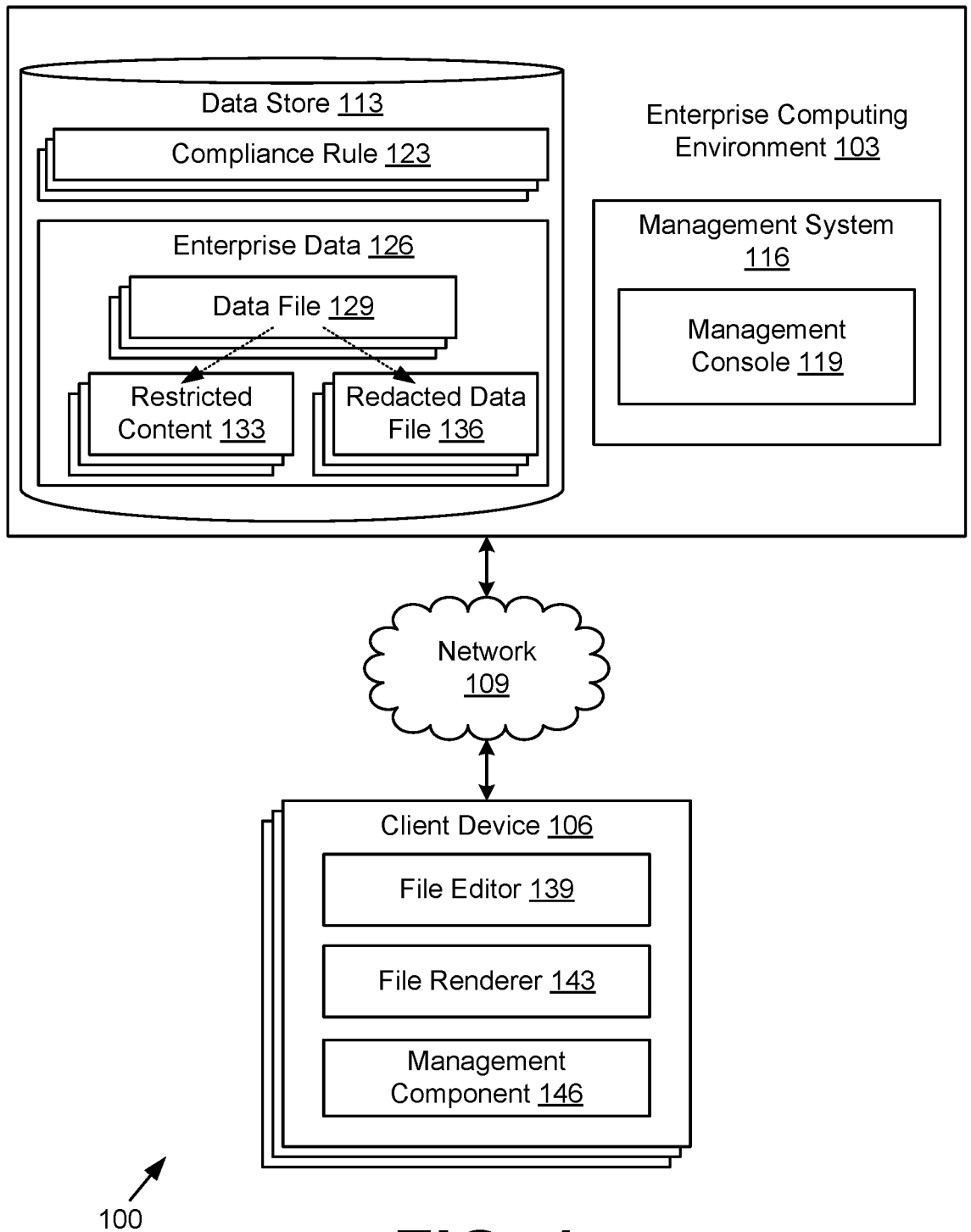
FIG. 1 is a drawing of an example of a networked environment.

With reference to FIG. 1, shown is an example of a networked environment 100. The networked environment 100 includes an enterprise computing environment 103 and a client device 106, which are in data communication through a network 109. The network 109 includes the Internet, one or more intranets, extranets, wide area networks (WANs), local area networks (LANs), wired networks, wireless networks, or any combination of two or more such networks. The network 109 in various examples comprises satellite networks, cable networks, Ethernet networks, and telephony networks.

The enterprise computing environment 103 is a computing environment that is operated by an enterprise, such as a business or other organization. The enterprise computing environment 103 comprises a computing device, such as a server computer, that provides computing capabilities. Alternatively, the enterprise computing environment 103 employs multiple computing devices that are arranged in one or more server banks or computer banks. Such computing devices in one example are located in a single installation. In another example, the computing devices for the enterprise computing environment 103 are distributed among multiple different geographical locations. In one case, the enterprise computing environment 103 includes multiple computing devices that together form a hosted computing resource or a grid computing resource.

Additionally, the enterprise computing environment 103 in some examples operates as an elastic computing resource where the allotted capacity of computing-related resources, such as processing resources, network resources, and storage resources, vary over time. In other examples, the enterprise computing environment 103 includes or is operated as one or more virtualized computer instances that are executed in order to perform the functionality that is described herein. Generally, the enterprise computing environment 103 is operated in accordance with particular security protocols such that the enterprise computing environment 103 is considered a "trusted" computing environment by the enterprise that operates the enterprise computing environment 103.

Various systems are executed in the enterprise computing environment 103, and various data is stored in a data store 113 that is accessible to the enterprise computing environment 103. For example, a management system 116 is executed in the enterprise computing environment 103 to monitor and manage the operation of multiple client devices 106.

In some examples, the management system 116 includes a management console 119, which facilitates the administration of client devices 106 by administrators. For instance, the management console 119 generates user interfaces that are rendered on a display device to facilitate administrators operating and interacting with the management system 116. Such user interfaces facilitate an administrator inputting commands or other information for the management system 116. The user interfaces also include, for example, presentations of statistics or other information regarding the client devices 106 that are managed by the management system 116.

The data store 113 shown in FIG. 1 is representative of multiple data stores 113 that are accessible to components of the enterprise computing environment 103. The data stored in the data store 113 includes compliance rules 123 and enterprise data 126. Each compliance rule 123 specifies, for example, one or more conditions that must be satisfied for a client device 106 to be deemed compliant with the compliance rule 123. In one example, a compliance rule 123 specifies that particular applications are prohibited from being installed on a client device 106. In another example, a compliance rule 123 specifies that a lock screen is required to be generated when the client device 106 is "awoken" from a low power "sleep" state and that a passcode is required for a user to unlock the lock screen. In various examples, compliance rules 123 are based on time, geographical location, or network properties. For instance, a compliance rule 123 in one example is satisfied when a client device 106 is located within a particular geographic location. A compliance rule 123 in another example is satisfied when the client device 106 is in communication with a particular network 109, such as a particular local area network that is managed by the enterprise computing environment 103. Furthermore, a compliance rule 123 in another example is satisfied upon the time and date matching specified values. In various examples, the enterprise computing environment 103, the client device 106, or a combination of both the enterprise computing environment 103 and the client device 106 determine whether a compliance rule 123 has been satisfied.

Another example of a compliance rule 123 involves identifying whether a user belongs to a particular group of authorized users. Such a compliance rule 123 can be embodied in the form of a "whitelist" or a "blacklist" that specifies whether particular users or groups of users are authorized users. When content is identified by a user or the management system 116 as comprising restricted content 133, the user or the management system 116 can identify individual users or groups of users that are allowed to view the restricted content 133. For example, a document that is redacted by a legal department can be associated with a compliance rule 123 indicating certain individuals of a legal team, or an entire legal group, can access all content of the file, including the restricted content 133. When a user within the list of authorized users or groups of users requests access to the document, the system can automatically present the entire document, including the redacted content.

In one example, the user requesting access to a file can be identified based on a user name and password combination, secure token, or other identifying information stored on or entered into the client device 106. The identifying information can be transmitted to the enterprise computing environment 103 with the request for file access in one example and evaluated as a compliance rule 123.

As mentioned above, enterprise data 126 is also stored in the data store 113. The enterprise data 126 comprises data associated with the enterprise that operates the enterprise computing environment 103. Such enterprise data 126 includes data files 129, which are, for example, collections of data that include content. Examples of data files 129 include word processing document files, spreadsheet files, Portable Document Format (PDF) files, digital image files, and multimedia files. Applications in the client device 106 or the enterprise computing environment 103 are used to edit data files 129 or render data files 129 so that a human can perceive the content represented therein.

As will be described in further detail below, restricted content 133 within data files 129 is identified and stored separately from the data file 129. Restricted content 133 is, for example, confidential or sensitive content, and it is undesirable for users or systems to obtain the restricted content 133 unless authorized to do so. Examples of restricted content 133 include financial information, employee records, private data, information regarding secret enterprise projects, and information subject to attorney-client privilege.

As will also be described in further detail below, redacted data files 136 are generated and stored separately from the data files 129 and the restricted content 133. The redacted data files 136 are, for example, replicas of the respective data files 129 with the restricted content 133 omitted. In this regard, the restricted content 133 is not included in the redacted data file 136.

The client device 106 is representative of multiple client devices 106 that are coupled to the network 109. The client device 106 comprises, for example, a processor-based computer system. According to various examples, a client device 106 is embodied in the form of a desktop computer, a laptop computer, a personal digital assistant, a mobile phone, a web pad, or a tablet computer system. The client device 106 includes output devices, such as a display and audio speakers, as well as one or more input devices, such as a mouse, keyboard, touch pad, or touch screen, which facilitate a user interacting with the client device 106.

The client device 106 is configured to execute a file editor 139, a file renderer 143, and a management component 146. The file editor 139 is used, for example, to edit the content of data files 129. Examples of a file editor 139 include a word processor, a spreadsheet application, a PDF file editor, an image file editor, an audio file editor, and a video editor.

The file renderer 143 is used to render data files 129, redacted data files 136, and unredacted versions of data files 129, so that content represented therein is perceivable by a user. Examples of a file renderer 143 include a word processing application, a spreadsheet application, a PDF viewer, a webpage browser, a file browser, an image viewer, or a multimedia player.

In one example, the file editor 139 and the file renderer 143 comprise applications that are executable by the client device 106. In alternative examples, the file editor 139 and the file renderer 143 comprise plugins or modules that are executed in connection with one or more applications. Additionally, both the file editor 139 and the file renderer 143 in some examples are embodied in the form of a containerized content application that is capable of restricting access to enterprise data 126 or other resources as determined by the management component 146. The containerized content application facilitates an authorized user of the client device 106 accessing resources that are stored in the data store 113 of the enterprise computing environment 103 by retrieving the resources from the enterprise computing environment 103 and presenting the resources in a user interface. The containerized content application also communicates with the management system 116 so that various functionality of the containerized content application can be enabled or disabled according to specified compliance rules 123. For example, an administrator may specify a security policy that the management system 116 and containerized content application implement to restrict a user's ability to open, edit, print, or share documents using the containerized content application based on compliance rules 123. In addition, the containerized content application facilitates a user of the client device 106 storing documents and other resources in the data store 113 of the enterprise computing environment 103. To this end, the containerized content application transmits the resource to the enterprise computing environment 103 in response to the resource being created, saved, or modified by the containerized content application. Additionally, the containerized content application isolates or encrypts resources, so that other applications and components are unable to access or decode resources that are stored in particular file directories for the containerized content application.

Although the file editor 139 and the file renderer 143 are shown in FIG. 1 as being separate components, in other examples, a single component, such as a single application or a single application plugin or module, comprises both the file editor 139 and the file renderer 143. In such examples, the single component performs the functionality of both the file editor 139 and the file renderer 143.

Furthermore, the functionality of the file editor 139 and the file renderer 143 in some examples is provided by the enterprise computing environment 103 and offered as a service to the client device 106. In this regard, the client device 106 communicates with the enterprise computing environment 103 using an Application Programming Interface (API) or other suitable protocol to transfer data and execute commands so that the functionality of the file editor 139 and file renderer 143 is performed by the enterprise computing environment 103 and made available to the client device 106.

The management component 146 is executed in the client device 106 to, for example, monitor and manage data, software components, and hardware components with respect to the client device 106. The management component 146 also identifies whether the client device 106 is operating in accordance with one or more compliance rules 123 that are associated with the client device 106. In one example, the management component 146 functions as a device management service that operates as a portion of an operating system for the client device 106. In another example, the management component 146 functions as a device management agent that operates in the application layer of the client device 106. The management component 146 in other examples comprises an application wrapper that interfaces with a software component to facilitate overseeing, monitoring, managing, and controlling resources, such as applications and resources accessible to the applications, for the client device 106. In alternative examples, the management component 146 comprises a portion of an application that was developed, for example, using a Software Development Kit (SDK) to facilitate overseeing, monitoring, managing, and controlling resources, such as applications and resources accessible to the applications.

The management component 146 communicates with the management system 116 in order to facilitate the management system 116 monitoring and managing the client device 106. The management component 146 in some examples obtains compliance rules 123 from the management system 116, and the management component 146 determines and reports back to the management system 116 whether the client device 106 is operating in compliance with the compliance rules 123. In an alternative example, the management component 146 transmits data that indicates the status of properties and settings for the client device 106, and the management system 116 uses this data to determine whether the client device 106 is operating in compliance with the compliance rules 123. If it is determined that the client device 106 is not in compliance with one or more compliance rules 123, the management component 146 or the management system 116 can cause a remedial action to be performed. Examples of remedial actions include notifying a user of the device or an administrator of the management system 116, causing device settings to be changed so that the client device 106 becomes compliant with the compliance rules 123, and wiping data in the client device 106.

Next, examples of the operation of the networked environment 100 and its various components are described. To begin, it is assumed that the client device 106 has obtained a data file 129 by creating the data file 129 or retrieving the data file 129 from the enterprise computing environment 103. In the present example, the data file 129 includes restricted content 133. In this regard, the restricted content 133 is confidential or sensitive information, and it is undesirable for users or systems to obtain the restricted content 133 unless authorized to do so. Examples of restricted content 133 include financial information, personal records, private data, information regarding secret enterprise projects, and information subject to attorney-client privilege. However, the data file 129 also includes content that is not restricted content 133.

The file editor 139 is configured to identify the restricted content 133 in the data file 129. In one example, the file editor 139 identifies the restricted content 133 through the assistance of a user of the client device 106. For example, the file editor 139 generates a user interface, and the user identifies restricted content 133 in the data file 129 by using a mouse, touch screen, or other input device for the client device 106. The user in one such example uses an input device to denote restricted content 133 by "highlighting" text of the data file 129. In another example, the user uses an input device to define a spatial region within an image that denotes the restricted content 133. In another example, the user uses an input device to select a segment of time of a video or audio data file 129 to specify that the selected segment includes restricted content 133.

In another example, the management system 116 provides an administrator console that facilitates an administrator of the enterprise computing environment 103 identifying restricted content 133. In such an example, the administrator console generates a user interface, and an administrator interacts with the user interface to identify restricted content 133 using one or more of the approaches described above. In alternative examples, the management system 116 provides a user console that generates a user interface and facilitates a user of the client device 106 identifying restricted content 133 using one or more of the approaches described above.

In other examples, the file editor 139 or enterprise computing environment 103 identifies restricted content 133 in the data file 129 automatically without the assistance of the user of the client device 106. For instance, the file editor 139 in one such example parses text in a data file 129 and compares the text to strings including keywords, names, addresses, digits, government issued identifiers, street addresses, bank routing or account numbers, and phone numbers that have been defined to be indicative of restricted content 133. If the text in the data file 129 matches one or more of the defined strings, the file editor 139 determines that the text includes restricted content 133.

In some examples, the file editor 139 detects that text is restricted content 133 if the formatting or structure of the text matches a predefined format or structure. The file editor 139 in one such example determines that a string having the format of "NNN-NNN-NNNN," where "N" is any number, is a telephone number that is restricted content 133. In another example, the file editor 139 determines that an instance of a currency character, such as a dollar sign character, followed by one or more numbers is restricted content 133.

In some examples, the file editor 139 communicates with a third-party service, such as a geographic map service or a telephone directory service, using an API to facilitate identifying restricted content 133. In one such example, the file editor 139 transmits text or other content from a data file 129 to a third-party telephone directory service, and the telephone directory service returns information that indicates whether the content includes, for example, a telephone number of a business or individual. If the telephone directory service indicates that the content includes such a telephone number, the file editor 139 determines the content to be restricted content 133.

In another example, the file editor 139 or enterprise computing environment 103 performs visual content recognition techniques, such as facial recognition or object recognition, to identify individuals or objects represented in an image or video data file 129. The file editor 139 in these examples compares the identified objects and individuals to objects and individuals that have been defined to be indicative of restricted content 133. For example, if the file editor 139 detects that an individual involved with a secret project for the enterprise is shown during a segment of a video, the file editor 139 determines that the segment in which the individual appears includes restricted content 133.

In other examples, the file editor 139 or enterprise computing environment 103 uses sound recognition techniques to identify restricted content 133 in a data file 129. In one such example, the file editor 139 performs voice recognition processing to identify individuals who are speaking in an audio or video data file 129. If the file editor 139 detects the voice of an individual involved with a secret project for the enterprise in segments of the audio or video data file 129, the file editor 139 determines that those segments include restricted content 133.

In other examples, the data file 129 comprises a template that includes defined fields that denote where restricted content 133 is or will be located. Such a template in one example includes text and user-fillable fields. In this example, the file editor 139 identifies the content provided by a user in the user-fillable fields as being restricted content 133, and the remaining content is considered unrestricted content. In some of these examples, when a user provides content in the user-fillable fields, the content is associated with data that represents a mapping of the content to the corresponding user-fillable fields. Later, the file renderer 143 can use the mapping data to generate an unredacted version of the data file 129.

After restricted content 133 for a data file 129 has been identified, the file editor 139 proceeds to generate a redacted data file 136, which is a redacted version of the data file 129, with the restricted content 133 being omitted. In one example, the file editor 139 generates the redacted data file 136 by creating a new data file 129 and then replicating unrestricted content from the original data file 129 to the newly created redacted data file 136. In an alternative example, the file editor 139 generates the redacted data file 136 by removing the restricted content 133 from the original data file 129 and then "saving" the modified data file 129.

In some examples, the file editor 139 or enterprise computing environment 103 replaces the restricted content 133 in the original data file 129 with replacement content. Replacement content for text includes, for example, randomly selected characters or predefined characters, such as null or blank characters. Examples of replacement content for images and video include, for example, predefined graphics, such as single-colored shapes. Replacement content for audio includes, for example, a segment of silence, a particular tone, or a particular audio clip. In some examples, the replacement content is chosen such that the content notifies a user that content has been redacted. Such replacement content in these examples includes text, graphics, or audio that includes a word or phrase, such as the words "confidential" or "redacted," that, when rendered, indicates to a user that content has been redacted.

In other embodiments, the file editor 139 or enterprise computing environment 103 does not replace the restricted content 133 with other content. In these examples, the file renderer 143 is unable to render the redacted data file 136, or the redacted data file 136 appears corrupted or incomplete when rendered.

Additionally, after restricted content 133 for a data file 129 has been identified, the file editor 139 or the enterprise computing environment 103 stores the restricted content 133 separate from both the original data file 129 and the redacted data file 136. In one example, the restricted content 133 is stored in the data store 113, which is operated in accordance with security protocols that prevent access to unauthorized individuals and systems.

In other examples, the file editor 139 stores the restricted content 133 and the redacted data file 136 in separate storage locations, such as separate disks or partitions, of the same device or the same computing system. The storage location of the restricted content 133 can then be encrypted to restrict access to the restricted content 133. Alternatively, the file editor 139 stores the restricted content 133 in storage that is located in a different geographic location relative to the location of the original data 129 and the redacted file 136. Additionally, in some examples, the restricted content 133 is separated into multiple portions and stored in separate locations. By storing the restricted content 133 in the data store 113 or other secured systems, the restricted content 133 is prevented from being accessed without authorization.

In some examples, the original data file 129 is discarded after the restricted content 133 and the redacted data file 136 have been created. For these examples, the restricted content 133 is subjected to additional levels of security protocols relative to the redacted data file 136. As a result, the restricted content 133 is prevented from unauthorized access, even if the redacted data file 136 is accessed by an unauthorized user or system.

The file editor 139 also generates instructions for generating an unredacted version of the data file 129 using both the restricted content 133 and the redacted data file 136. The instructions specify, for example, which portions of the redacted data file 136 are to be replaced by particular portions of the restricted content 133. For examples in which the file editor 139 did not replace restricted content 133 with replacement content for the redacted data file 136, the instructions specify the locations within the redacted data file 136 where the restricted content 133 should be inserted. In some examples, the instructions also specify the storage location for the restricted content 133, such as a uniform resource locator (URL) or a file system path, that the file renderer 143 uses for retrieving the restricted content.

The instructions for generating the unredacted version of the data file 129 are stored in various locations according to various examples. In one example, the instructions are stored in conjunction with the corresponding restricted content 133 in the data store 113 that is provided by the enterprise computing environment 103. In one such example, the instructions and restricted content 133 are stored in the same file. In an alternative example, the instructions are included within the redacted data file 136. In other examples, the instructions are stored separately from both the restricted content 133 and the redacted data file 136.

Next, examples of the file renderer 143 generating an unredacted version of the redacted data file 136 are described. The file renderer 143 in some examples is executed in a different client device 106 other than the client device that generated the redacted data file 136. Such examples arise, for example, when one user "shares" the redacted data file 136 with another user. The file renderer 143 in other examples is executed in the same client device 106 that generated the redacted data file 136.

To begin, the file renderer 143 retrieves the redacted data file 136. As discussed above, the redacted data file 136 omits the restricted content 133 that was identified by the file editor 139. In some examples, by virtue of the restricted content 133 being omitted, the file renderer 143 is unable to render the redacted data file 136. In these examples, the redacted version of the redacted data file 136 appears to be corrupt or missing data that enables accurate rendering. In alterative examples, the file editor 139 has replaced the omitted restricted content 133 with replacement content, and the rendering of the redacted data file 136 provides a replica of the original data file 129, except for the restricted content 133 being omitted. Thus, at this point, the file renderer 143 has access to unrestricted content for the data file 129, but the corresponding restricted content 133 is inaccessible to the file renderer 143.

The file renderer 143 is also executed to retrieve the restricted content 133 and the instructions for generating the unredacted version of the data file 129. In some examples, the retrieval of the restricted content 133 and instructions is subject to satisfaction of one or more compliance rules 123 that have been assigned to the client device 106. In one such example, the management component 146 or the management system 116 prevents the client device 106 from accessing the restricted content 133, until time-based, location-based, or network-based compliance rules 123 are satisfied. Once the compliance rules 123 have been satisfied, the management component 146 and the management system 116 facilitate the client device 106 retrieving the restricted content 133 and the instructions for generating the unredacted version of the data file 129.

In some examples, a redacted data file 136 is associated with multiple portions of restricted content 133. In these examples, each portion of restricted content 133 can be subject to a respective compliance rule 123. For example, upon a first compliance rule 123 being satisfied, the file renderer 143 is granted access to a first portion of restricted content 133. Later, upon a second compliance rule 123 being satisfied, the file rendered 143 is granted access to a second portion of the restricted content 133. In this way, the accessibility of each portion of restricted content 133 can be controlled individually by a respective compliance rule 123.

After the file renderer 143 has obtained the redacted data file 136, the restricted content 133, and the instructions for generating the unredacted version of the redacted data file 136, the file renderer 143 proceeds to generate the unredacted version of the redacted data file 136. As discussed above, the instructions in some examples specify where in the redacted data file 136 the file editor 139 is to insert particular portions of the restricted content 133. In other examples, the instructions specify where in the redacted data file 136 the file editor 139 is to replace the replacement content with particular portions of the restricted content 133. Once the restricted content 133 has been combined with the redacted data file 136 as specified by the instructions, an unredacted version of the redacted data file 136 has been generated. The unredacted version of the redacted data file 136 is, for example, a replica of the data file 129 that was processed by the file editor 139 as discussed above. The file renderer 143 then renders the unredacted version of the redacted data file 136 by, for example, generating audio, video, images, graphics, or text that is represented in the unredacted version of the redacted data file 136.

In some examples, the management component 146 or the file renderer 143 restricts particular actions being taken with respect to the unredacted version of the redacted data file 136. For instance, although the file renderer 143 is typically configured to cause word processing document files to be printed, the file renderer 143 or the management component 146 in some examples prevents the unredacted version of the redacted data file 136 from being printed. Alternatively, the file renderer 143 or the management component 146 facilitates only portions of the unredacted version of the redacted data file 136 that are not restricted content 133 being printed. As another example, although the file renderer 143 is typically configured to facilitate a user "sharing" content by transmitting the content to another client device 106, the file renderer 143 or the management component 146 in some examples prevents the unredacted version of the redacted data file 136 from being transmitted to other client devices 106. Alternatively, the file renderer 143 or the management component 146 facilitates only portions of the unredacted version of the redacted data file 136 that are not restricted content 133 from being shared.

After the unredacted version of the redacted data file 136 has been generated and rendered by the file renderer 143, the management component 146 continues to monitor the client device 106 and determine whether the client device 106 complies with the one or more compliance rules 123 that are assigned to the client device 106. If the management component 146 or the management system 116 determines that one or more of the compliance rules 123 have been violated, the management component 146 initiates a remedial action. In one example, the management component 146 causes the unredacted version of redacted the data file 136 to be discarded by the client device 106 upon a compliance rule 123 being violated. In another example, the management component 146 causes one or more settings or properties of the client device 106 to be changed so that the client device 106 becomes compliant with the compliance rules 123. In other examples, the user of the client device 106 or an administrator of the enterprise computing environment 103 is notified when a compliance rule 123 is violated. By initiating remedial actions in response to a compliance rule 123 being violated, the management system 116 and the management component 146 reduce the possibility of the restricted content 133 for a data file 129 being accessible to an unauthorized user or system.

Figure 2:
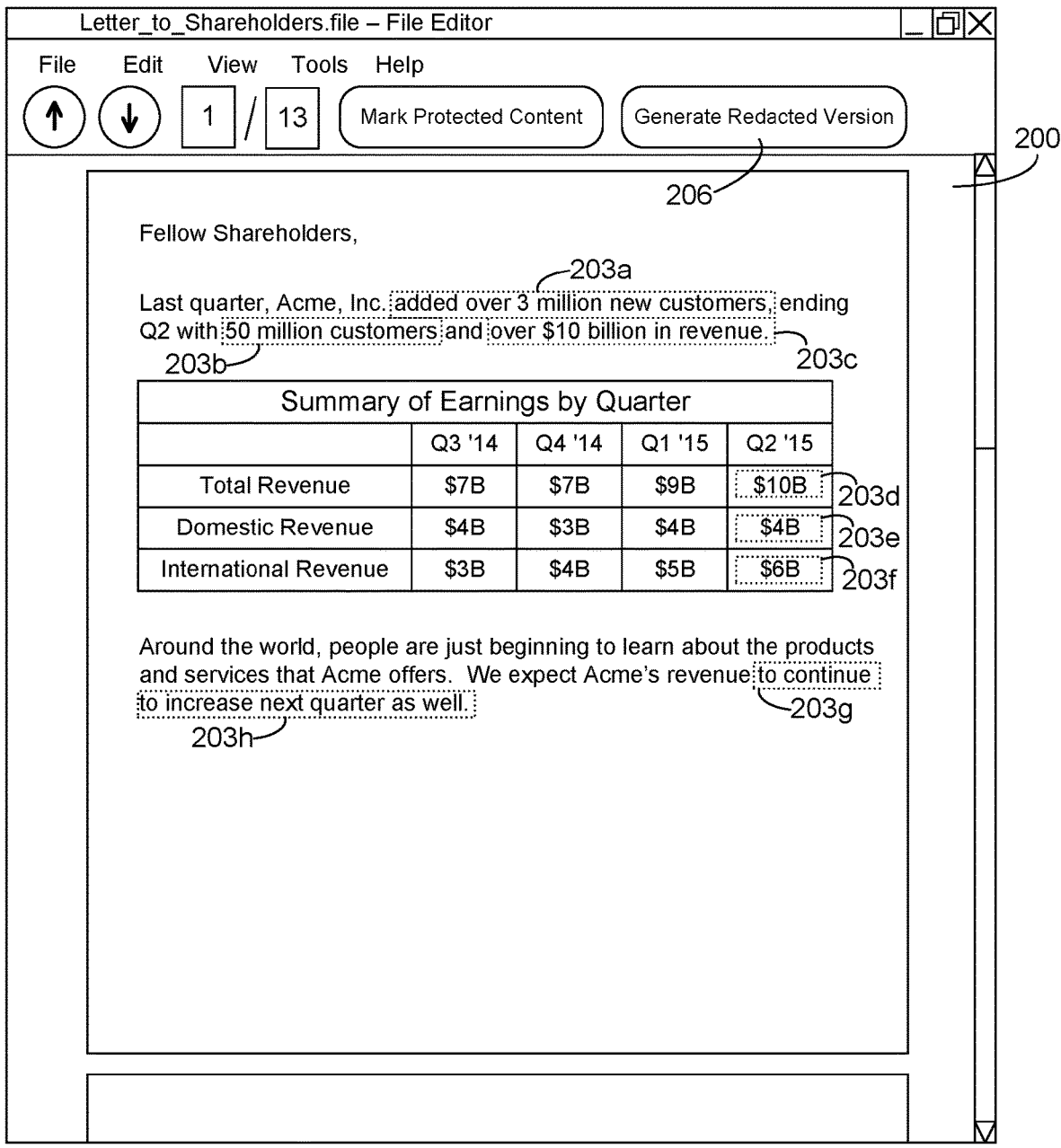
FIG. 2 is a drawing of an example of a user interface for a file editor in a client device.

With reference to FIG. 2, shown is an example of a user interface 200 generated by the file editor 139 and rendered by the client device 106. In particular, the user interface 200 includes a rendering of a data file 129, which in this example comprises a word processing document. The word processing document includes restricted content 133, such as confidential financial information and statements regarding an enterprise's customers and forecasted revenue. The word processing document also includes content that is not restricted content 133, such as the document's salutation and financial information that was previously publicly available.

The user interface 200 includes multiple user selection regions 203a-203h. The user selection regions 203a-203h indicate portions of the data file 129 that the user has specified as being restricted content 133. To generate the user selection regions 203a-203h, a user has "highlighted" text using an input device, such as a mouse or a touch screen for the client device 106. In the present example, upon the user generating the user selection regions 203a-203h, the file editor 139 identifies that the text within the user selection regions 203a-203h comprises restricted content 133.

As described above, the file editor 139 is configured to generate a redacted data file 136 that omits the restricted content 133. When a user of the client device 106 selects the button 206 using an input device for the client device 106, the file editor 139 initiates the process of generating the redacted data file 136, as described above. The user can also be prompted to identify authorized users or groups of users who are permitted access to the restricted content 133, which can be provided to the enterprise computing environment 103 as a compliance rule 123. The restricted content 133 can be stored separately from the redacted data file 136. Furthermore, the restricted content 133 can be stored in accordance with security protocols such that the restricted content 133 is considered "secured" and inaccessible to unauthorized users and systems.

Figure 3:
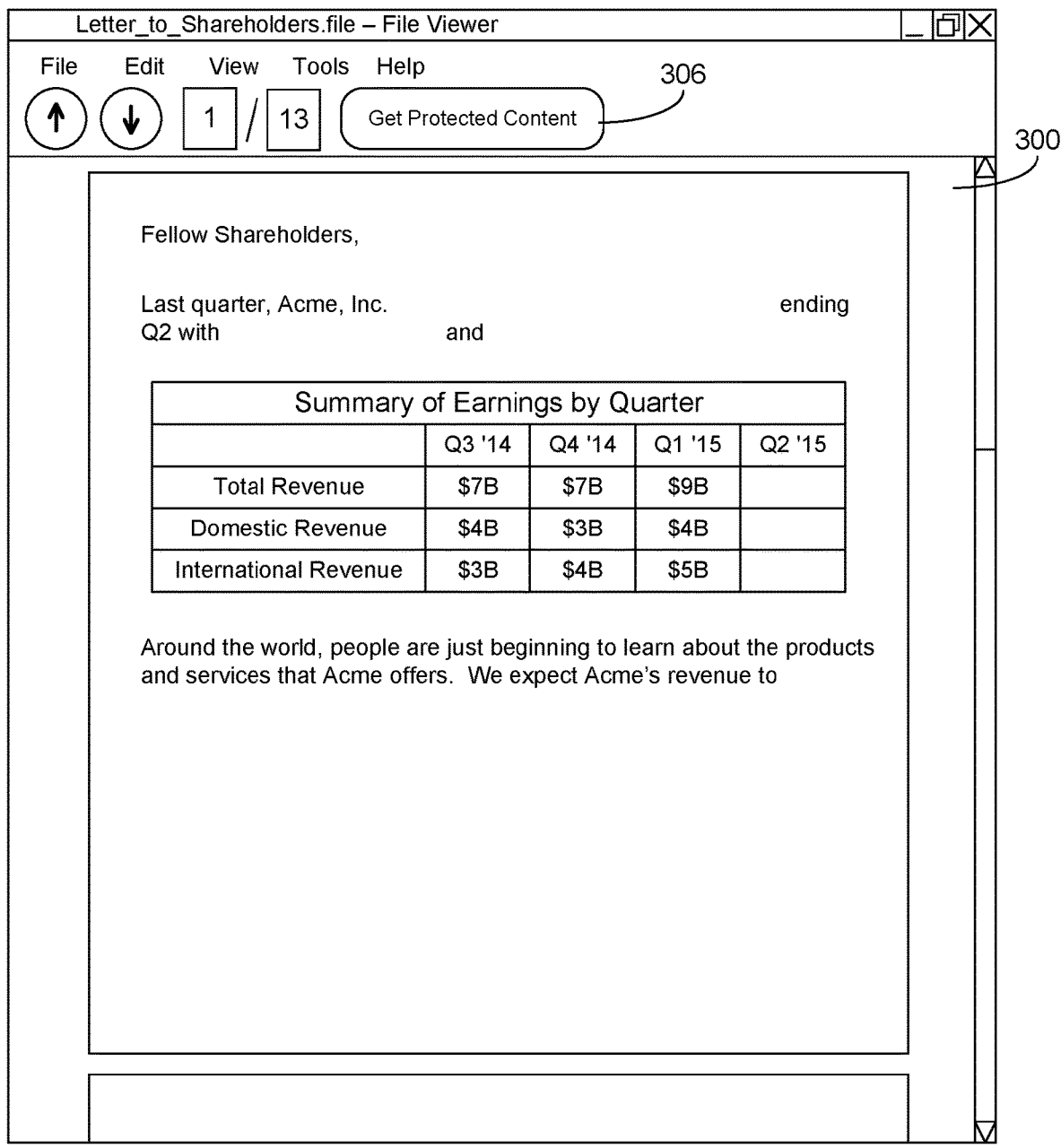
FIGS. 3-4 are drawings of examples of user interfaces for a file renderer in a client device.

With reference to FIG. 3, shown is an example of a user interface 300 generated by the file renderer 143 and rendered by the client device 106. In particular, the user interface 300 includes a rendering of the redacted data file 136 that was generated upon the button 206 in FIG. 2 being selected by a user.

For the example shown in FIG. 3, the file editor 139 generated the redacted data file 136 by replacing restricted content 133 with space characters, which appear blank when rendered by the file renderer 143. As such, the redacted data file 136 has been rendered by the file renderer 143, and the restricted content 133 for the data file 129 is not included. In the present example, blank space has been rendered instead of the restricted content 133.

The user interface 300 also includes a button 306. When a user of the client device 106 selects the button 306 using an input device, the file renderer 143 initiates the process of retrieving the restricted content 133 and the instructions for generating the unredacted version of the redacted data file 136. As discussed above, the management component 146 in the client device 106 and the management system 116 in the enterprise computing environment 103 prevent the client device 106 from accessing the restricted content 133 unless the compliance rules 123 assigned to the client device 106 have been satisfied.

Figure 4:
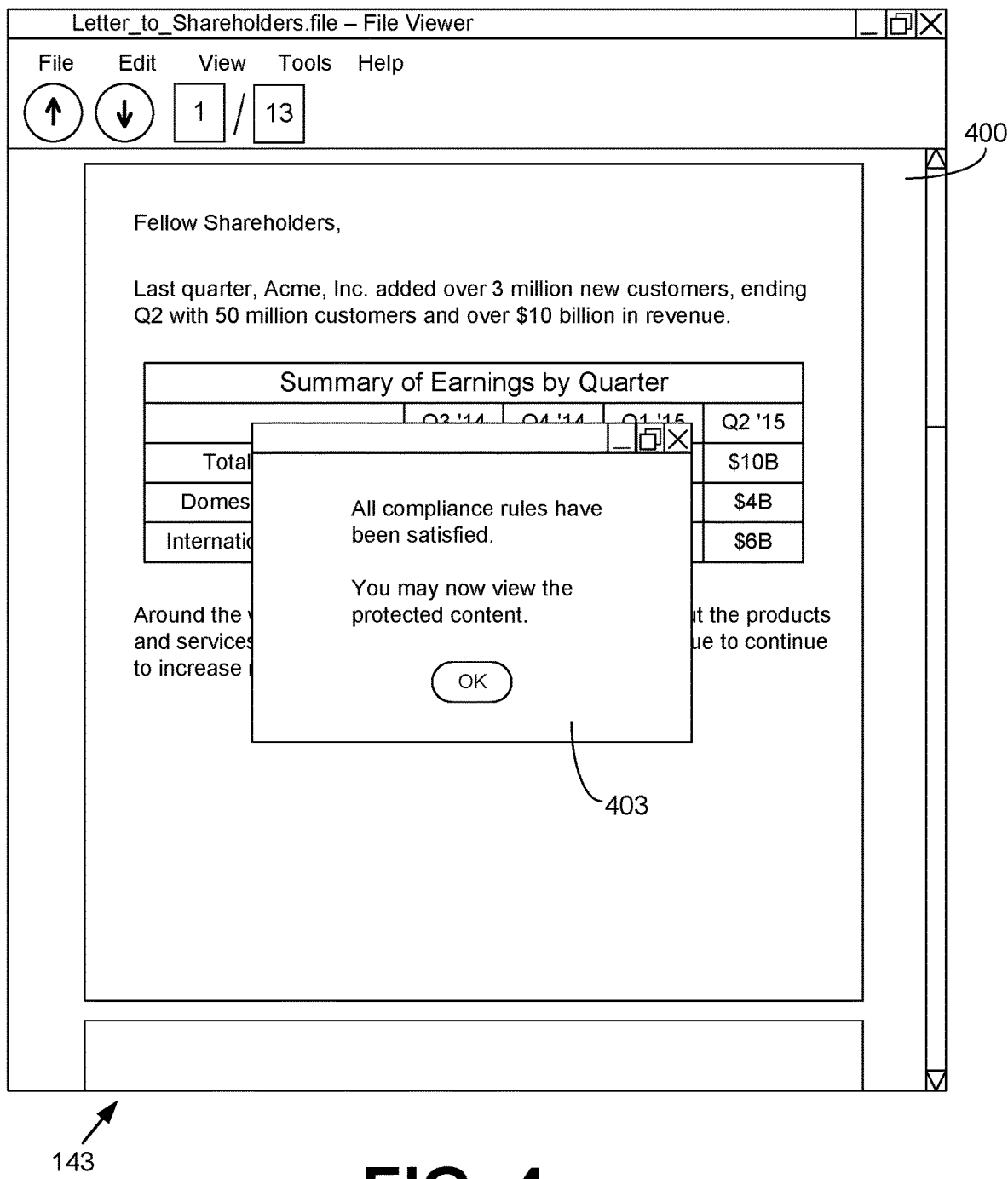

With reference to FIG. 4, shown is an example of a user interface 400 generated by the file renderer 143 and rendered by the client device 106. In particular, the user interface 400 includes a rendering of the unredacted version of the redacted data file 136 that was generated upon a user of the client device 106 selecting the button 306 in FIG. 3. The rendering of the unredacted version of the redacted data file 136 includes the restricted content 133 that was omitted from the rendering of the redacted data file 136 in FIG. 3.

The user interface 400 also includes a message box 403. The message box 403 notifies the user of the client device 106 that the file renderer 143 and the management component 146 have caused a compliance check to be executed and that the client device 106 complies with the compliance rules 123 that are assigned to the client device 106. If the client device 106 did not comply with the compliance rules 123, the message box 403 would notify the user that the compliance rules 123 were not satisfied. In addition, the file renderer 143 would not have retrieved the restricted content 133 and generated the unredacted version of the redacted data file 136. By retrieving the restricted content 133 and generating the unredacted version of the redacted data file 136 only if the client device 106 complies with the compliance rules 123, the file renderer 143 reduces the likelihood of the restricted content 133 being accessed by an unauthorized user or system.

Figure 5:
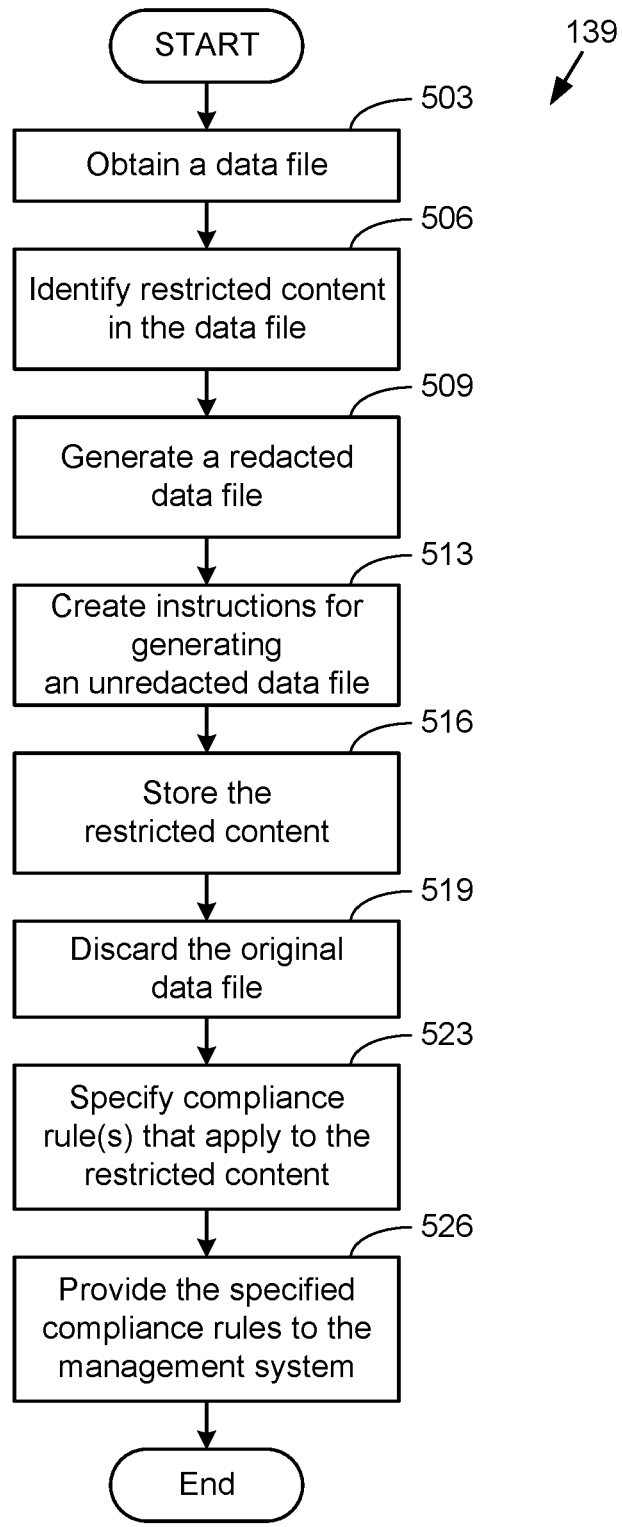
FIG. 5 is a flowchart illustrating an example of functionality implemented by a file editor in a client device.

With reference to FIG. 5, shown is a flowchart that provides an example of a portion of the operation of the file editor 139. In particular, FIG. 5 provides an example of the file editor 139 identifying restricted content 133 in a data file 129 and then generating a redacted data file 136. It is understood that the flowchart of FIG. 5 provides merely an example of the many different types of functional arrangements that may be performed to implement the operation the file editor 139 as described herein. Additionally, the flowchart of FIG. 5 may be viewed as depicting an example of steps of a method implemented in the client device 106.

Beginning with step 503, the file editor 139 obtains a data file 129, which includes restricted content 133 and content that is not restricted. At step 506, the file editor 139 identifies the restricted content 133 in the data file 129. As discussed above, in some examples, the restricted content 133 is identified by the file editor 139 with the assistance of a user of the client device 106. In other examples, the file editor 139 automatically identifies the restricted content 133 without the assistance of a user using one or more of the techniques described above.

As shown in step 509, the file editor 139 generates a redacted data file 136. The redacted data file 136 is, for example, a replica of the original data file 129, except that the restricted content 133 has been omitted. In this regard, the restricted content 133 is not included in the redacted data file 136. In some examples, the restricted content 133 is replaced with replacement content, such as predefined text, graphics, or audio.

At step 513, the file editor 139 then creates instructions for generating an unredacted version of the redacted data file 136. These instructions are used by the file renderer 143 for combining the redacted data file 136 with the restricted content 133 so that an unredacted version of the redacted data file 136 is created. In some examples, the instructions specify which portions of the redacted data file 136 are to be replaced by particular portions of the restricted content 133. For instance, a mapping may be created that ties references to portions of the redacted data file 136 with portions of the restricted content 133. In other examples, the instructions specify the locations within the redacted data file 136 where the restricted content 133 should be inserted.

At step 516, the restricted content 133 is stored separate from the redacted data file 136. In some examples, the stored restricted content 133 is stored in accordance with security protocols such that the restricted content 133 is considered "secured" and inaccessible to unauthorized users or systems. In some examples, the restricted content 133 is stored separately so that the restricted content 133 is inaccessible to the file renderer 143 until the file renderer 143 unlocks the restricted content 133, for example, after a compliance check. As shown at step 519, the original data file 129, which includes the restricted content 133, is discarded.

The file editor 139 then moves to step 523 and specifies the one or more compliance rules 123 that apply to the stored restricted content 133. In one example, a user operates the file editor 139 to specify the applicable compliance rules 123. A user in one example specifies a time or a time widow when the restricted content 133 is to be made accessible to a particular client device 106 or user. In another example, a profile is associated with the client device 106, and compliance rules 123 corresponding to the profile are assigned to the stored restricted content 133. As discussed above, the management system 116 and the management component 146 prevent client devices 106 from accessing the stored restricted content 133, unless the corresponding compliance rules 123 are satisfied. As shown at step 526, the specified compliance rules 123 are then provided to the management system 116. Thereafter, the process ends.

Figure 6:
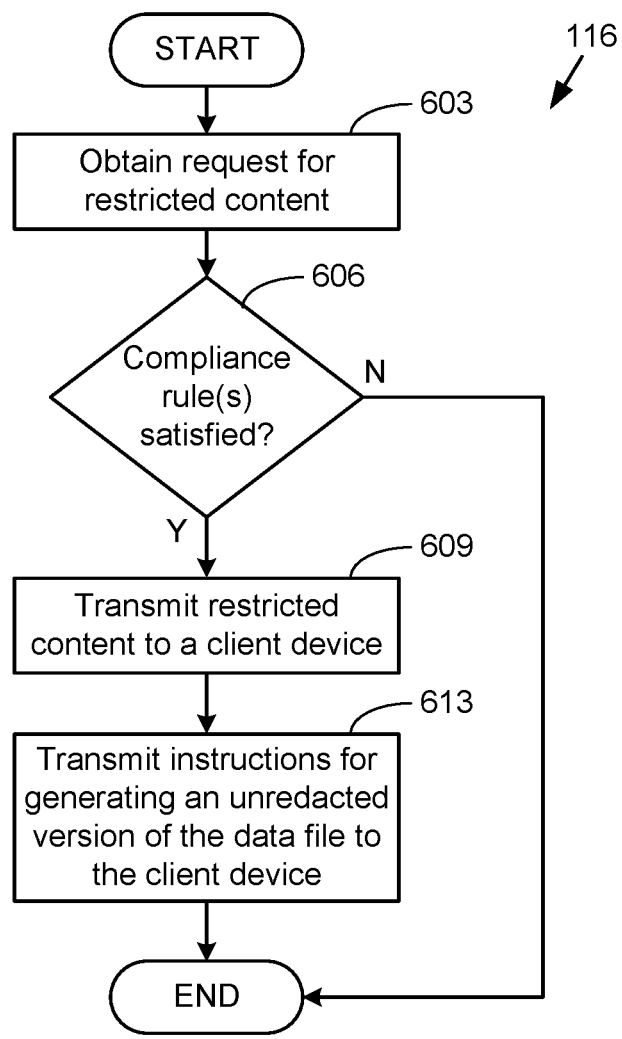
FIG. 6 is a flowchart illustrating an example of functionality implemented by a management system of an enterprise computing environment.

With reference to FIG. 6, shown is a flowchart that provides an example of a portion of the operation of the management system 116. In particular, FIG. 6 provides an example of the management system 116 obtaining a request for restricted content 133 and then determining whether to provide the restricted content 133 to a client device 106. It is understood that the flowchart of FIG. 6 provides merely an example of the many different types of functional arrangements that may be performed to implement the operation of management system 116 as described herein. Additionally, the flowchart of FIG. 6 may be viewed as depicting an example of steps of a method implemented in the enterprise computing environment 103.

Beginning at step 603, the management system 116 obtains a request from a client device 106 for restricted content 133 that is stored as enterprise data 126 in the data store 113. At step 606, the management system 116 determines whether the one or more compliance rules 123 that are assigned to the client device 106 are satisfied. In one example, the management system 116 queries the management component 146 in the client device 106 for an indication of whether the client device 106 is in compliance with the compliance rules 123. In another example, the management system 116 requests data indicative of settings and properties for the client device 106, and the management system 116 uses the received data to determine whether the client device 106 complies with the compliance rules 123.

If the client device 106 does not satisfy the compliance rules 123, the process ends. Otherwise, as shown at step 609, the management system 116 transmits the restricted content 133 to the client device 106 if the compliance rules 123 are satisfied. In addition, the management system 116 transmits instructions for generating the unredacted version of the redacted data file 136 to the client device 106, as shown at step 613. Thereafter, the process ends.

Figure 7:
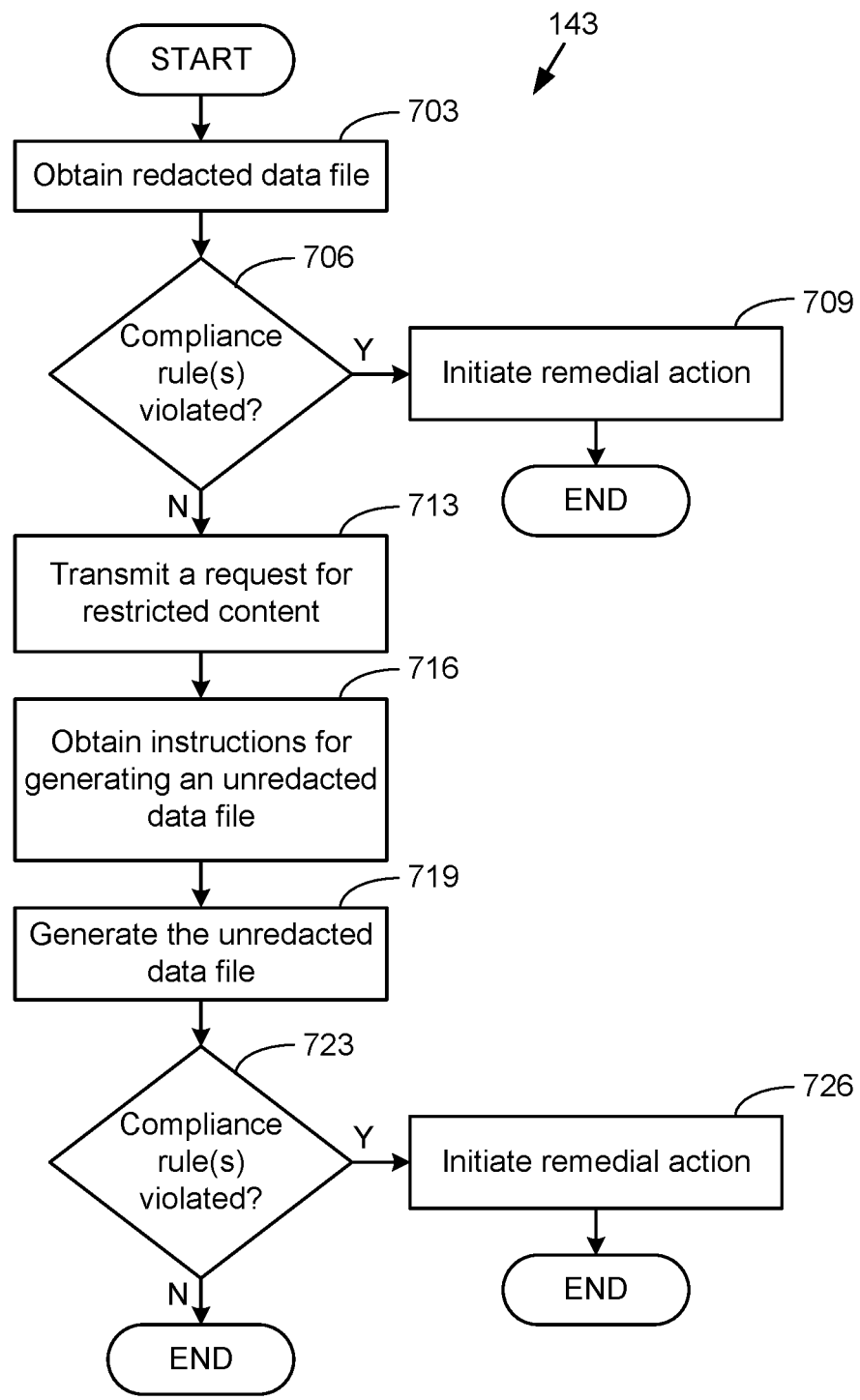
FIG. 7 is a flowchart illustrating an example of functionality implemented by a file renderer in a client device.

With reference to FIG. 7, shown is a flowchart that provides an example of a portion of the operation of file renderer 143. In particular, FIG. 7 provides an example of the file renderer 143 obtaining a redacted data file 136 and then generating an unredacted version of the redacted data file 136. It is understood that the flowchart of FIG. 7 provides merely an example of the many different types of functional arrangements that may be performed to implement the operation of file renderer 143 as described herein. Additionally, the flowchart of FIG. 7 may be viewed as depicting an example of steps of a method implemented in the client device 106.

Beginning at step 703, the file renderer 143 obtains a redacted data file 136. As discussed above, the redacted data file 136 does not include restricted content 133. At step 706, the file renderer 143 determines whether one or more compliance rules 123 that are assigned to the client device 106 are violated. In one example, the file renderer 143 uses the management component 146 to communicate with the management system 116 to determine whether one or more of the compliance rules 123 have been violated. If a compliance rule 123 has been violated, the file renderer 143 moves to step 709 and initiates a remedial action. Examples of a remedial action include notifying a user of the client device 106 or an administrator of the management system 116 of the non-compliance, modifying a setting or property of the client device 106 so that the client device 106 becomes compliant with the compliance rules 123, or wiping data from the client device 106. After step 709, the process ends.

If, at step 706, the compliance rules 123 are not violated, the file renderer 143 moves to step 713 and transmits a request to the enterprise computing environment 103 for the restricted content 133 that corresponds to the redacted data file 136. Additionally, the file renderer 143 obtains the instructions for generating an unredacted version of the redacted data file 136, as shown at step 716. In one example, these instructions are included with the restricted content 133. In another example, the instructions are embedded within the redacted data file 136. In other examples, the instructions are stored separate from the restricted content 133 and the redacted data file 136. At step 719, the file renderer 143 then generates the unredacted version of the redacted data file 136 using the restricted content 133, the redacted data file 136, and the instructions that were obtained at step 716.

As shown at step 723, the file renderer 143 optionally then determines whether one or more of the compliance rules 123 have been violated. In one example, the file renderer 143 uses the management component 146 to communicate with the management system 116 to determine whether one or more of the compliance rules 123 have been violated. If a compliance rule 123 has been violated, the file renderer 143 moves to step 726 and initiates a remedial action. Examples of a remedial action include notifying a user of the client device 106 or an administrator of the management system 116 of the non-compliance, modifying a setting or property of the client device 106 so that the client device 106 becomes compliant with the compliance rules 123, or wiping data from the client device 106. In one example, the remedial action includes preventing access to the unredacted version of the redacted data file 136 by, for example, deleting the unredacted version of the redacted data file 136 from the client device 106. After step 726, the process ends. Otherwise, if the compliance rules 123 have not been violated, the process ends without initiating a remedial action.

In other examples, one or more steps from FIG. 7 may be combined. For example, when a client device 106 requests a data file 129 at step 703, the request can include identifying information for a user so that the management system 116 can determine whether to grant full or restricted access to the particular user for the requested data file 129. If the user has access, the instructions to access restricted content 133 can be automatically provided (step 716) with the data file 129. In one example, instructions for accessing restricted content 133 are separately provided, but in other examples, the enterprise computing environment 103 can automatically provide the data file 129 including restricted content to authorized users.

The flowcharts of FIGS. 5-7 show examples of the functionality and operation of implementations of components described herein. The components of the networked environment 100 described herein can be embodied in hardware, software, or a combination of hardware and software. If embodied in software, each step in the flowcharts of FIGS. 5-7 may represent a module or a portion of code that comprises computer instructions to implement the specified logical function(s). The computer instructions may be embodied in the form of, for example, source code that comprises human-readable statements written in a programming language and/or machine code that comprises machine instructions recognizable by a suitable execution system, such as a processor in a computer system or other system. If embodied in hardware, each step may represent a circuit or a number of interconnected circuits that implement the specified logical functions.

Although the flowcharts show a specific order of execution, it is understood that the order of execution may differ from that which is shown. For example, the order of execution of two or more steps may be switched relative to the order shown. Also, two or more steps shown in succession may be executed concurrently or with partial concurrence. Further, in some examples, one or more of the steps shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The enterprise computing environment 103, the client device 106, and other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and components that are executable by the one or more processors of the processing circuit. For example, the management system 116, the file editor 139, the file renderer 143, the management component 146, and other components may be stored in one or more storage devices and be executable by one or more processors. Also, the data store 113 may be embodied in the one or more storage devices.

The management system 116, the file editor 139, the file renderer 143, the management component 146, and other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more or more of the components described herein that comprise software or computer instructions can be embodied in any non-transitory computer-readable medium for use by or in connection with an instruction execution system such as, for example, a processor in a computer system or other system. Such a computer-readable medium may contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, etc. Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

It is emphasized that the examples provided above are merely examples of implementations to set forth for a clear understanding of the principles of the disclosure. Many variations and modifications may be made to the examples described above without departing substantially from the spirit and principles of the disclosure. All such modifications and variations are intended to be included herein within the scope of this disclosure.

Therefore, the following is claimed:

1. A method, comprising:
   identifying, using a computing device, restricted content of a data file, the data file being stored in a data store associated with a particular enterprise computing environment;
   generating, using the computing device, a redacted version of the data file, the restricted content being omitted from the redacted version of the data file;
   generating, using the computing device, one or more restricted content data files comprising one or more portions of the restricted content of the data file;
   providing, using the computing device, a client device with the redacted version of the data file in response to a request received in the computing device over a network;
   obtaining, using the computing device, a request to view an unredacted version of the data file from the client device;
   determining, using the computing device, that the client device satisfies at least one compliance rule specifying when the client device is permitted to obtain the unredacted version of the data file;
   generating, using the computing device, one or more instructions for generating an unredacted version of the data file from the redacted version of the data file stored on the client device, the one or more instructions specifying one or more locations within the redacted version of the data file where the restricted content should be inserted; and
   providing, using the computing device, the one or more instructions to the client device over the network.

2. The method of claim 1, wherein identifying the restricted content of the data file comprises obtaining user input that specifies the restricted content.

3. The method of claim 1, further comprising generating a user interface that facilitates a user providing a selection that specifies the restricted content.

4. The method of claim 1, wherein identifying the restricted content of the data file comprises comparing content of the data file with a list of a plurality of keywords.

5. The method of claim 1, wherein the one or more instructions further comprise one or more locations where the one or more restricted content data files are stored.

6. The method of claim 1, wherein generating, using the computing device, the redacted version of the data file comprises including at least a portion of the one or more instructions in the redacted version of the data file.

7. The method of claim 1, wherein the one or more compliance rules further specify that the client device executing the containerized content application must be located in a particular geographic location for the containerized content application to be authorized to generate the unredacted version of the data file.

8. A non-transitory computer-readable medium embodying computer instructions executable by a computing device, the computer instructions being configured to cause the computing device to at least:

identify restricted content of a data file, the data file being stored in a data store associated with a particular enterprise computing environment;

generate one or more restricted content data files comprising one or more portions of the restricted content of the data file;

provide a client device with the redacted version of the data file in response to a request received in the computing device over a network;

obtain a request to view an unredacted version of the data file from the client device; determine that the client device satisfies at least one compliance rule specifying when the client device is permitted to obtain the unredacted version of the data file;

generate one or more instructions for generating an unredacted version of the data file from the redacted version of the data file stored on the client device, the one or more instructions specifying one or more locations within the redacted version of the data file where the restricted content should be inserted; and provide the one or more instructions to the client device over the network.

9. The non-transitory computer-readable medium of claim 8, wherein the computer instructions are configured to store the restricted content separate from the redacted version of the data file by at least causing the computing device to store the restricted content in a data store that is operated in conjunction with a management system that monitors an operation of the computing device, the management system being associated with the particular enterprise computing environment.

10. The non-transitory computer-readable medium of claim 8, wherein the computer instructions are configured to cause the computing device to identify the restricted content by at least comparing content of the data file to a plurality of keywords.

11. The non-transitory computer-readable medium of claim 8, wherein removing the restricted content from the data file to generate the redacted version of the data file further comprises replacing the restricted content with content that indicates to a user that the restricted content has been removed from the redacted version of the data file.

12. The non-transitory computer-readable medium of claim 8, wherein the one or more compliance rules further specify that the client device executing the containerized content application must be physically located in a particular geographic location for the containerized content application to be authorized to generate the unredacted version of the data file.

13. The non-transitory computer-readable medium of claim 8, wherein the one or more instructions further comprise one or more locations where the one or more restricted content data files are stored.

14. The non-transitory computer-readable medium of claim 13, wherein the one or more instructions are included in the redacted version of the data file.

15. The non-transitory computer-readable medium of claim 13, wherein the one or more instructions are stored in a data store that is accessible to the computing device over a network.

16. The non-transitory computer-readable medium of claim 8, wherein the computer instructions are further configured to cause the computing device to:

determine that a second compliance rule associated with the restricted content is satisfied, the second compliance rule being satisfied when the client device is located in a particular geographic location.

17. The non-transitory computer-readable medium of claim 16, wherein the computer instructions are further configured to cause the computing device to:

determine that a third compliance rule associated with the restricted content is satisfied, the third compliance rule being satisfied when a current time matches a particular time and a current data matches a particular date.

18. The non-transitory computer-readable medium of claim 8, wherein the computer instructions are further configured to cause the computing device to prevent access to the unredacted version of the data file when the compliance rule is not satisfied.

19. The non-transitory computer-readable medium of claim 8, wherein the computer instructions are configured to cause the computing device to identify the restricted content by at least obtaining a user selection that specifies the restricted content.

* * * * *

UNITED STATES PATENT AND TRADEMARK OFFICE
CERTIFICATE OF CORRECTION

PATENT NO. : 12,277,242 B2
APPLICATION NO. : 16/188143
DATED : April 15, 2025
INVENTOR(S) : Erich Stuntebeck et al.

Page 1 of 1

It is certified that error appears in the above-identified patent and that said Letters Patent is hereby corrected as shown below:

On the Title Page

Item (63), Related U.S. Application Data, replace "Continuation of application No. 15/865,868, filed on Jan. 9, 2018, now Pat. No. 10,127,401." with -- Continuation of application No. 15/865,868, filed on Jan. 9, 2018, now Pat. No. 10,127,401, which is a continuation of application No. 14/673,307, filed on Mar. 30, 2015, now Pat. No. 9,875,372. --.

Signed and Sealed this
Twenty-seventh Day of May, 2025

Coke Morgan Stewart
*Acting Director of the United States Patent and Trademark Office*